March 27, 1951  C. E. GREENE ET AL  2,546,692
CONTROL SYSTEM

Filed June 13, 1947  7 Sheets-Sheet 4

INVENTORS.
CLAUDE E. GREENE
ROBERT B. LESHER
BY
Staebling and Kost
attys.

March 27, 1951     C. E. GREENE ET AL     2,546,692
CONTROL SYSTEM
Filed June 13, 1947     7 Sheets-Sheet 6
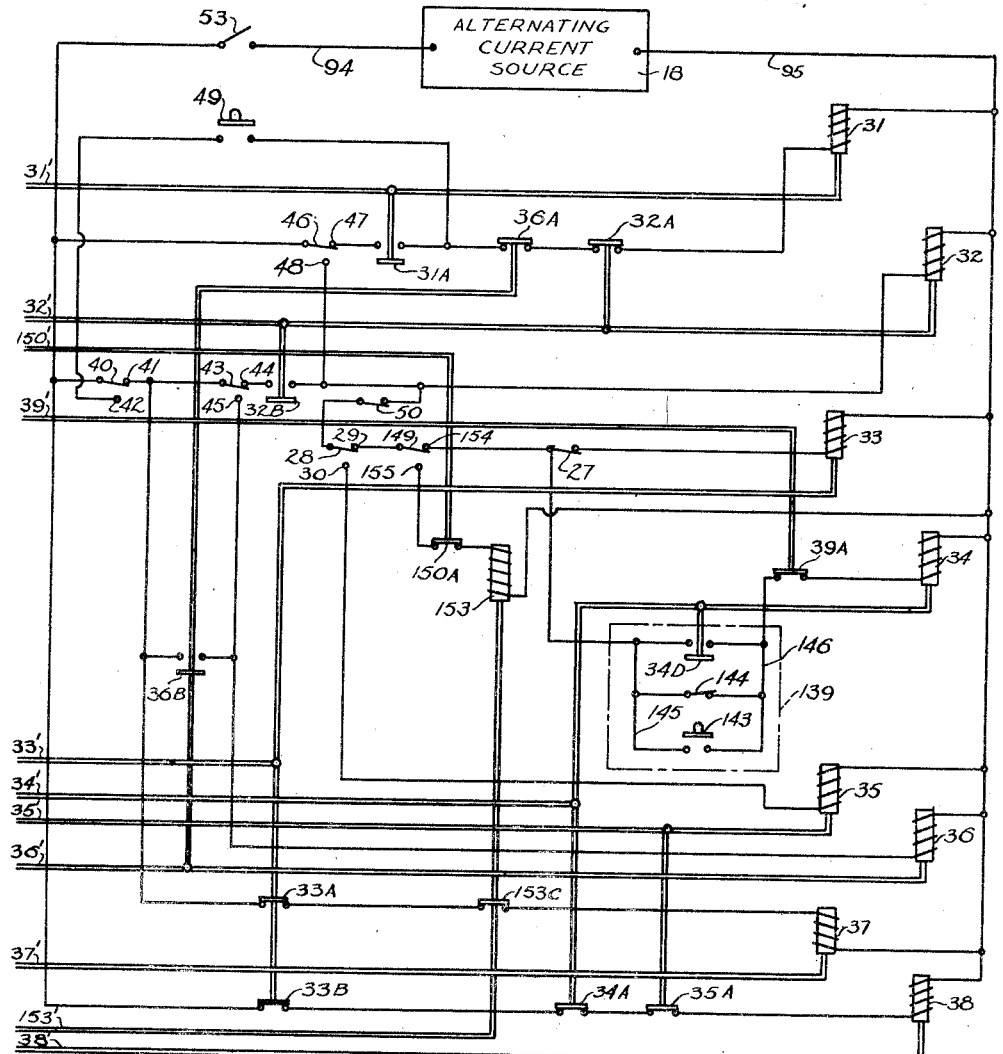
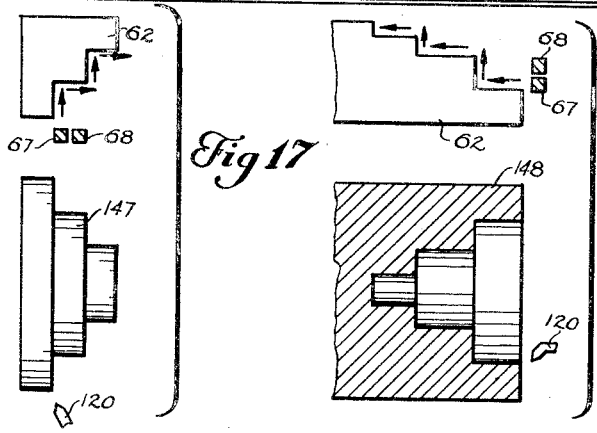
*Fig 10*
*Fig 17*
*Fig 18*
INVENTORS
CLAUDE E. GREENE
ROBERT B. LESHER
BY
*Woodling and Krost*
attys.

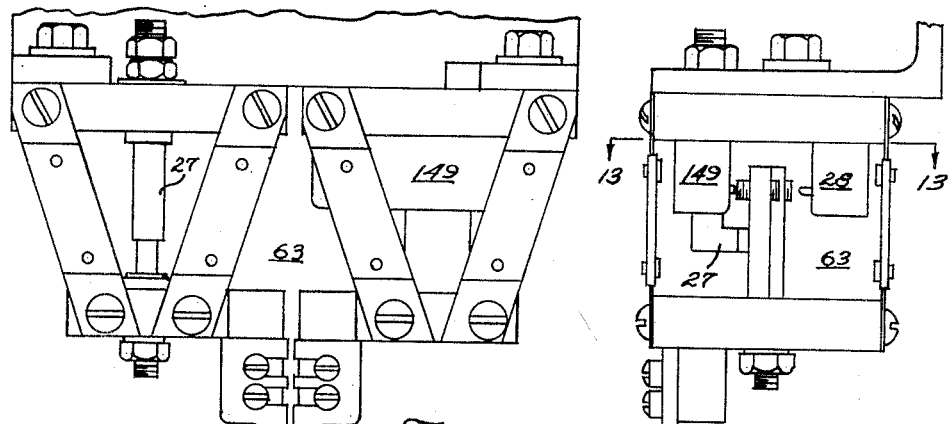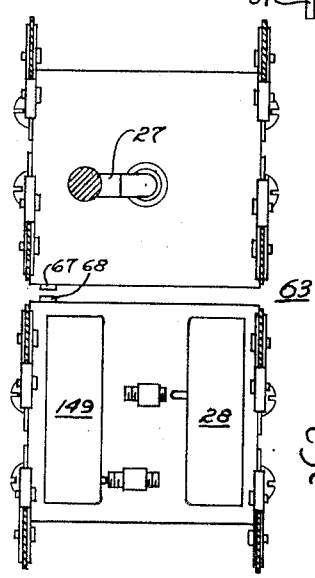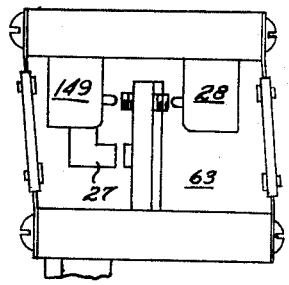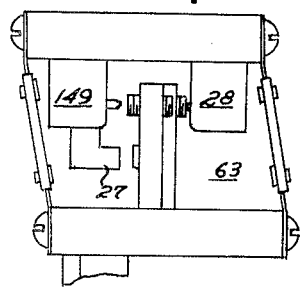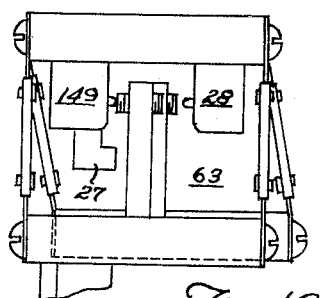

Patented Mar. 27, 1951

2,546,692

UNITED STATES PATENT OFFICE 2,546,692

CONTROL SYSTEM

Claude E. Greene and Robert B. Lesher, Sidney, Ohio, assignors to The Monarch Machine Tool Company, a corporation of Ohio Application June 13, 1947, Serial No. 754,552

20 Claims. (Cl. 318—162)

The invention relates generally to electrical control systems, and more particularly to power control systems for a machine tool.

An object of the invention is the provision of a power control system for a lathe that permits a predetermined cycle of operation of the lathe to be carried out under the dictates of a pattern.

Another object of the invention is the provision of a power control system in combination with a machine tool for controlling the machine tool in two directions of movement under the dictates of a pattern which is scanned by a tracer assembly having two scanning means that provide three speed conditions along one or both directions of movement.

Still another object of the invention is the provision of separate electric motors for driving the carriage and the cross-slide of a lathe under the dictates of a pattern controlled tracer assembly wherein the tracer assembly has two scanning means to effect three speed conditions of the cross-slide, and the pattern controls a predetermined cycle of operation that is accurately controllable and rapidly completed.

Yet another object of the invention is to provide a variable longitudinal feed rate of the carriage of a lathe to correspond inversely to variations in the surface speed of the workpiece so that a substantially uniform rate of material removal from the workpiece is accomplished.

Still another object of the invention is to provide automatic interruptions at each successive similar position in a predetermined cycle of operation of a machine tool.

Another object of the invention is the provision of separate electric motors for driving the carriage and the cross-slide of the lathe under the dictates of a pattern controlled tracer assembly wherein the tracer assembly has two scanning means to effect three speed conditions of the cross-slide, the carriage, or both, and the pattern controls predetermined cycle of operation that is accurately controllable and rapidly completed.

Other objects and a fuller understanding of the invention may be had by referring to the following description and claims, taken in conjunction with the accompanying drawings, in which:

Figure 10 is a circuit diagram of a switching system for controlling the motors shown in Figures 1 and 9 which circuit is a modification of the circuit of Figure 3;

Figure 11 is a side view of a modification of the tracer assembly shown in Figures 6 and 7;

Figure 12 is a front view of the tracer assembly of Figure 11;

Figure 13 is a top sectional view of the modified tracer assembly taken along the line 13—13 of Figure 12;

Figures 14, 15 and 16 are front views of the modified tracer assembly in second, third and fourth conditions of operation;

Figure 17 is a plan view of part of the pattern and contact fingers and showing a faceplate being shaped by the pattern; and Figure 18 is a plan view of part of the pattern and contact fingers and showing a step-boring operation as controlled by the pattern.

Figure 1:
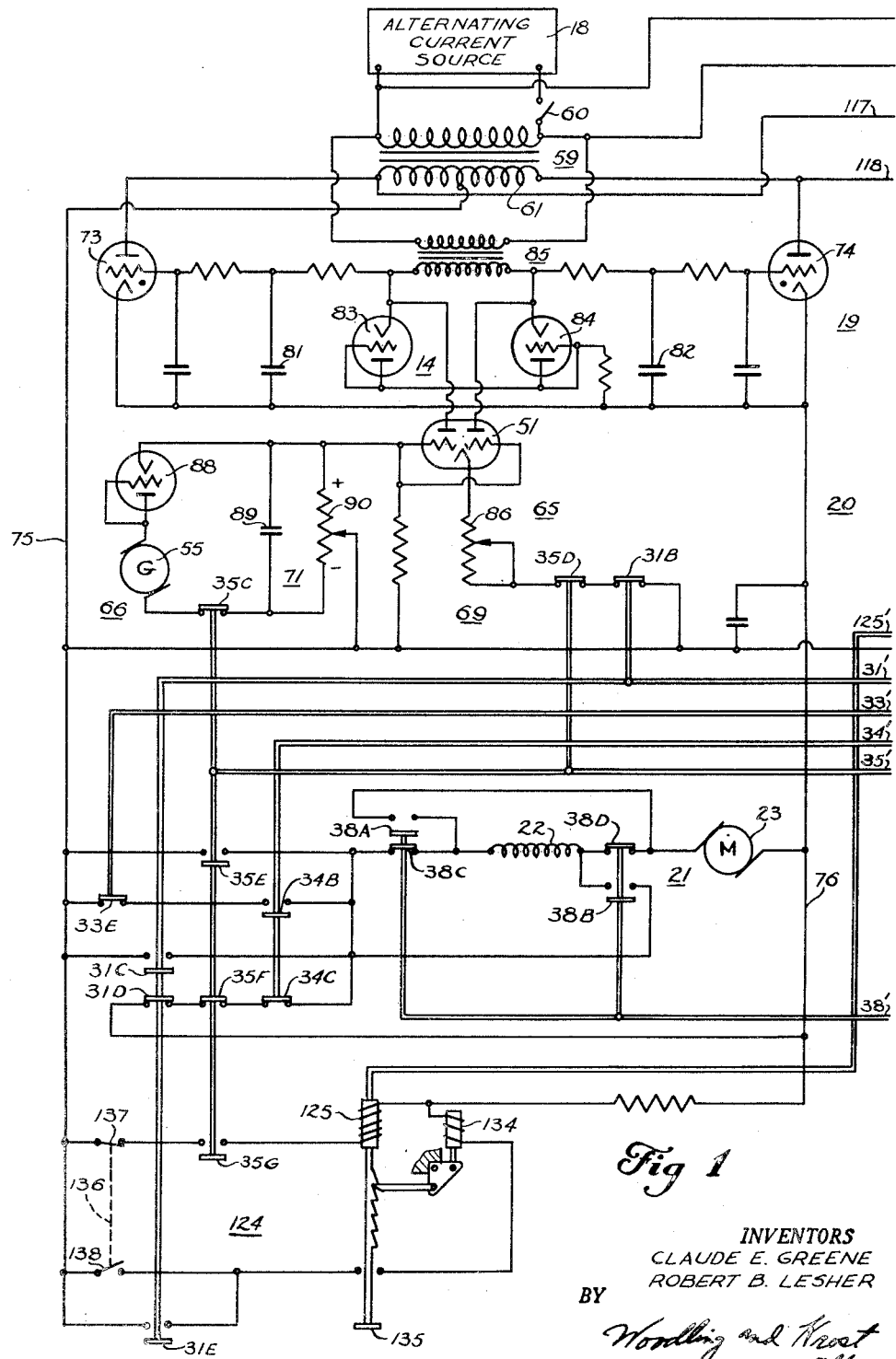
Figure 1 is a circuit diagram for a series electric motor powered by a controllable rectifier system.

Many attempts have been made to accurately control a machine tool according to the dictates of a pattern, but all previous attempts have been a compromise between accuracy and rapidity or speed of operation. The present invention solves this pressing problem by permitting rapid movement wherever accuracy in sizing or gauging is not essential, and effecting a change to a slow speed condition just prior to those points where accuracy is needed to precisely gauge or size a particular dimension.

The preferred embodiment of the invention will be shown as applied to an engine lathe, but it will be obvious that such a power control system could easily be adapted for use with any machine tool or material working or forming machine.

The adaptation of the invention as applied to an engine lathe will by example be shown as providing accurate control of the cross-slide of the lathe, but it will be apparent that the invention could equally well be applied to the accurate control of the carriage of the lathe.

The power control system includes generally, as best shown in Figures 1, 2, 3 and 4, a lathe 11 that has a carriage 12 and a cross-slide 13. The lathe 11 has a headstock 122, a tailstock 123 and a toolholder 121 carried by the cross-slide 13. A workpiece 119 is shown as being carried by the headstock 122 and tailstock 123, and a tool 120 is carried by the toolholder 121 for cutting the workpiece 119. A first drive means 16 is employed for driving the carriage for right and left longitudinal movements, and a second drive means 17 is employed for driving the cross-slide for in and out transverse movements. An alternating current source 18 supplies power to a rectifier system 19. The first drive means 16 includes an electric motor, which in the preferred embodiment has been shown as an alternating current or universal series motor 24. A first gear reduction unit 57 is connected between the motor 24 and the carriage 12 in order to properly reduce the speed of the first drive means 16. The second drive means 17 includes an electric motor which, for the purposes of this embodiment of the invention, is shown as an alternating current or universal series motor 21. The series motors 21 and 24 have been described as alternating current or universal series motors since in this embodiment, these motors are being operated from the rectifier system 19 which provides a pulsating or rectified alternating current, so that a laminated core structure is desirable in these motors. A second gear reduction unit 58 is connected between the motor 21 and the cross-slide 13 to reduce the speed of the motor to a usable speed. An electrical control system 20 is provided to control the flow of power between the rectifier system 19 and the first and second drive means 16 and 17. The rectifier system 19 includes a first and second rectifier device 14 and 15, which in this preferred embodiment of the invention have been shown as grid controlled rectifiers of the full-wave rectifying type. A power transformer 59 is adapted to be connected to the alternating current source 18 by a power switch 60. The transformer 59 has a mid-tapped secondary 61 for supplying alternating current power to the rectifier system 19. The electrical control system 20 includes a pattern or template 62 and a tracer assembly 63 for scanning the template. Also included in the electrical control system 20 are switch means 64 controlled by the tracer assembly 63, limit switches actuated by movements of the carriage 12 and cross-slide 13, relay means that are actuated by the switch means 64 and the limit switches, variable biasing means 65 for varying the output of the rectifier system 19, and compensating means 66 for maintaining the voltage output of the rectifier system 19 constant at a predeterminable setting for varying load conditions.

Figure 5:
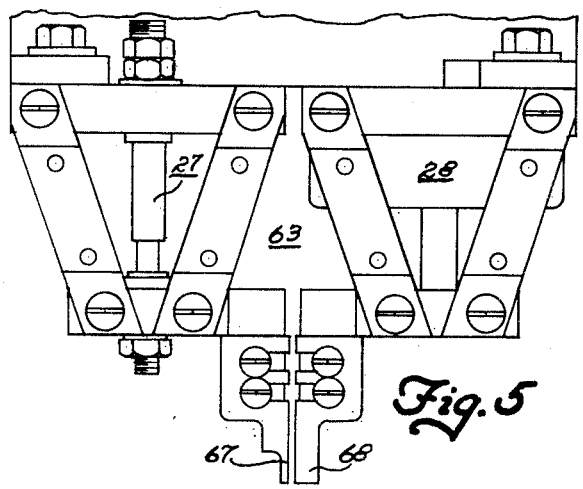
Figure 5 is a side view of a tracer assembly incorporating two finger means for scanning a pattern.
Figure 6:
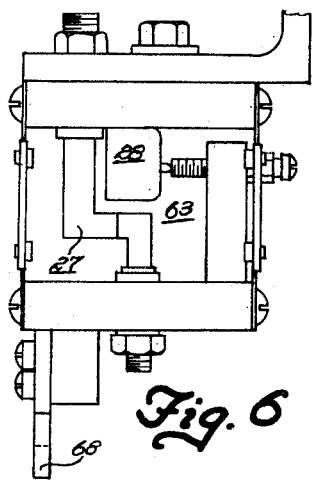
Figure 6 is a front view of the same tracer assembly of Figure 5.

To provide relative movement between the tracer assembly 63 and the pattern 62, the pattern 62 has been mounted upon the lathe 11, and the tracer assembly 63 has been mounted on the cross-slide 13 so that it will have the combined movements of the cross-slide 13 and the carriage 12. The tracer assembly 63, as shown in this preferred embodiment of the invention, includes a first and a second scanning means or finger means 67 and 68, respectively. A suggested construction for this first and second finger means of the tracer assembly 63 is shown in the Figures 5 and 6, and a more detailed description of the construction and operation of such a tracer assembly may be had by referring to the copending application filed June 13, 1947, Serial No. 754,553, entitled "Pattern Tracer Assembly."

Figure 3:
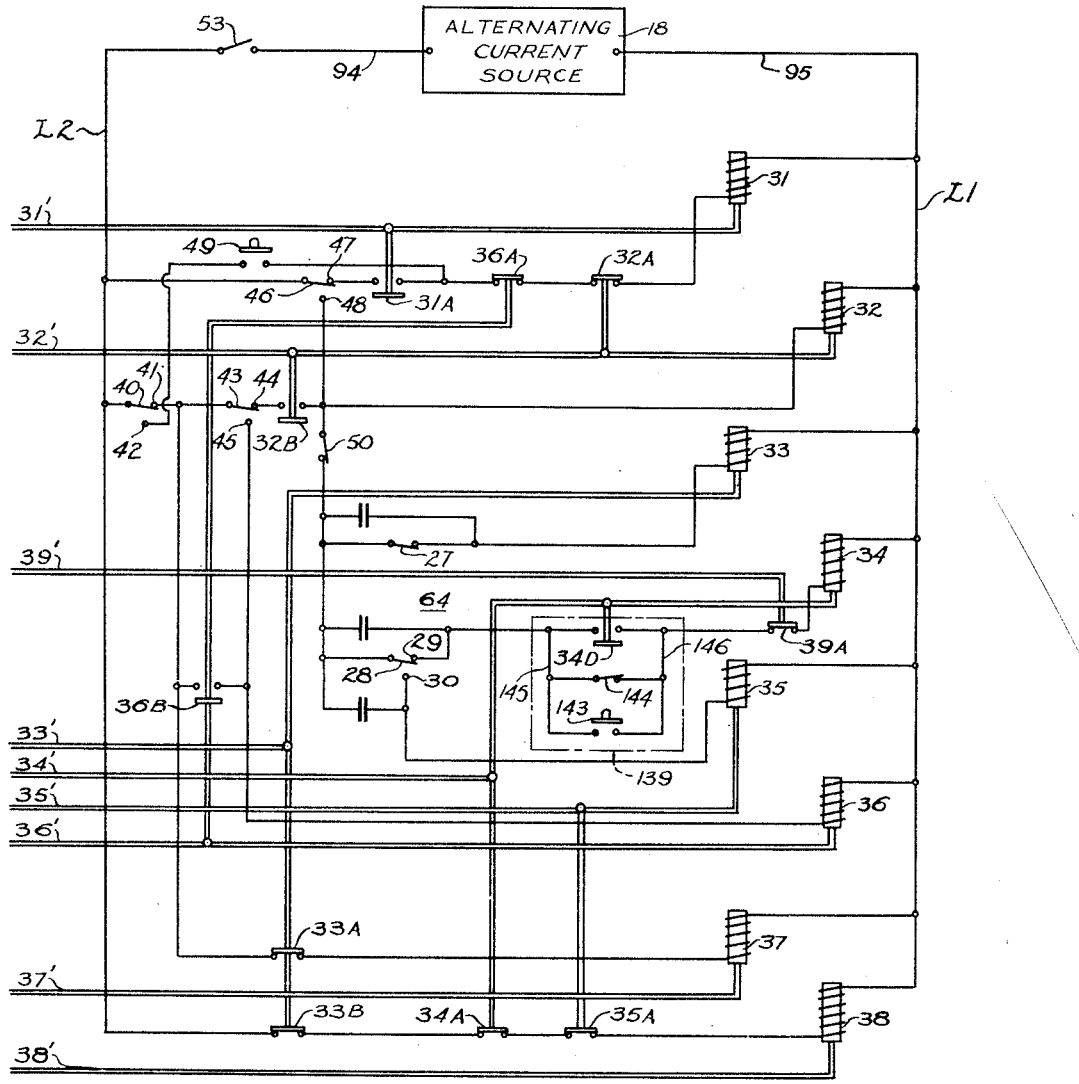
Figure 3 is a circuit diagram showing the switching system for controlling the motors shown in Figure 1 and Figure 2 under the dictates of a pattern controlled tracer assembly.
Figure 4:
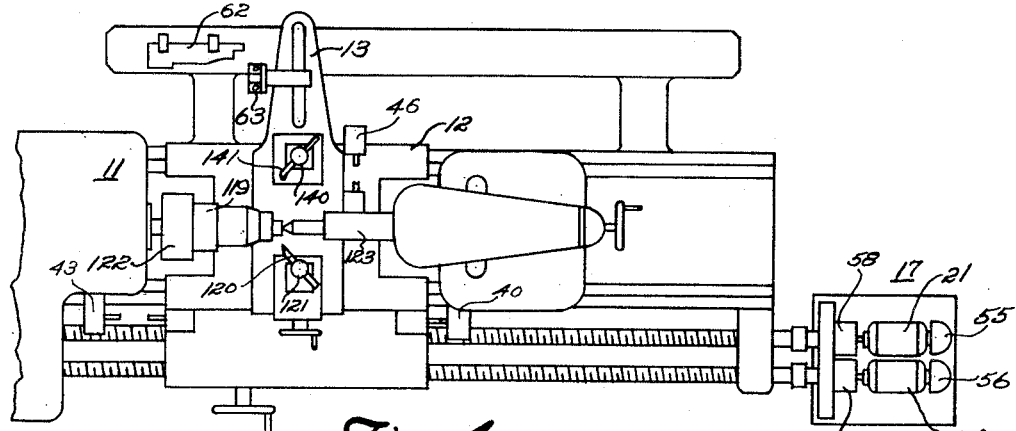
Figure 4 is a plan view of a lathe to which the power control system of this invention may be adapted for use.

For the purposes of this invention, the first and second scanning means 67 and 68 may be considered as having any suitable form for actuating the switch means 64. The switch means 64, as best shown in Figure 3, includes a first switch means or first tracer switch 27, and a second switch means or second tracer switch 28. The first and second tracer switches are adapted to be actuated, respectively by the first and second scanning means 67 and 68, and govern the electrical control system 20 to provide two speeds to the cross-slide on outward movements thereof, and to provide for leftward movements of the carriage. The rectifier system 19 as incorporated in this preferred embodiment of the invention may be of any suitable controllable rectifier type, and the rectifier system chosen to be shown with this preferred embodiment of the invention is similar in type and operation to the pending application Serial No. 737,931, filed March 28, 1947, entitled "Electrical Control System."

The first and second rectifier devices 14 and 15 are practically identical in structure and operating characteristics, and are connected to the secondary 61 for obtaining alternating current power therefrom. The variable biasing means 65 includes a first biasing circuit 69 for the first rectifier device 14, and a second biasing circuit 70 for the second rectifier device 15. The compensating means 66 includes a first compensating circuit 71 for the first rectifier device 14, and a second compensating circuit 72 for the second rectifier device 15. The first rectifier device 14 includes first and second rectifier tubes 73 and 74 adapted to deliver rectified alternating current power to the cross-slide motor 21 by the first and second connection means 75 and 76. The second rectifier device 15 includes third and fourth rectifier tubes 77 and 78 connected by connection means 117 and 118 to the secondary 61, and adapted to deliver rectified alternating current power to the carriage motor 24 by the third and fourth connection means 79 and 80. The first and second rectifier device 14 and 15 operate in a similar fashion, and a description of the operation of one will suffice for both. The first and second rectifier tubes 73 and 74 are biased by drawing grid current through the condensers 81 and 82 which are charged by this grid current to provide a negative bias on these tubes 73 and 74 to prevent them from firing. First and second thermionic tubes 83 and 84 are provided to discharge these condensers 81 and 82 and therefore permit the rectifier tubes 73 and 74 to fire and have a full output. The system of biasing on these first and second rectifier devices 14 and 15 is a direct current bias with an alternating current rider, the direct current bias being furnished by the charge on the condensers 81 and 82, and the alternating current rider being furnished by a grid transformer 85. The first biasing circuit 69 includes a third thermionic tube 51 and a variable potentiometer 86 adapted to vary the effective impedance of this third thermionic tube 51. By varying the variable potentiometer 86, the effective impedance of the third thermionic tube 51 can be varied to recharge the condensers 81 and 82 and provide an increased charge on these condensers. The end result of this first biasing circuit 69 is that with a low setting on the variable potentiometer 86, which is in effect a low bias, a maximum of current is passed by this third thermionic tube 51 to charge the condensers 81 and 82 so that they provide a high biased condition on the first and second rectifier tubes 73 and 74, which in turn results in a low output of the first rectifier device 14. Conversely, a high bias on the third thermionic tube 51 results in a high output of the first rectifier device 14. A similar result is obtained in the second rectifier device 15, where a second variable potentiometer 87 controls a fourth thermionic tube 52 to control the power output of the third and fourth rectifier tubes 77 and 78.

The compensating means 66 for the rectifier system 19 includes substantially identical first and second compensating circuits 71 and 72 for the first and second rectifier devices 14 and 15 respectively. Thus a description of the first compensating circuit 71 will suffice for both. The first compensating circuit 71 includes a first tachometer generator 55 that is adapted to be driven by the cross-slide motor 21, and thus develops a voltage proportional to the speed of this cross-slide motor 21. A fifth thermionic tube 88 rectifies the voltage of the tachometer generator 55, and a filter condenser 89 filters this rectified voltage which is then applied to a compensating potentiometer 90. The direction of current flow will be such that the bottom of the compensating potentiometer 90 will be negative with respect to the top of this potentiometer 90 as shown in Figure 1, therefore, the voltage applied to the thermionic tube 51 will be a positive bias. This positive bias opposes the negative bias supplied by the first variable potentiometer 86. The result obtained is that if the load of the cross-slide motor 21 increases to decrease the speed of the cross-slide motor 21, the generated voltage from the tachometer 55 will decrease, therefore less positive bias is supplied by the compensating potentiometer to this third thermionic tube 51. This means that the effective negative bias is increased, which increases the output of the first rectifier device 14, as previously described, thereupon maintaining the speed of the cross-slide motor 21 substantially uniform. In the second rectifier device 15, a second tachometer generator 56 in the second compensating circuit 72, and driven by the carriage motor 24, functions in a similar manner to provide a compensating voltage across a second compensating potentiometer 91 and maintain the speed of the carriage motor 24 substantially constant for variations in load. A third rectifier device 92, which is shown as a duo-triode tube 93, is connected across the secondary 61 and is adapted to supply rectified power for control purposes.

Figure 8:
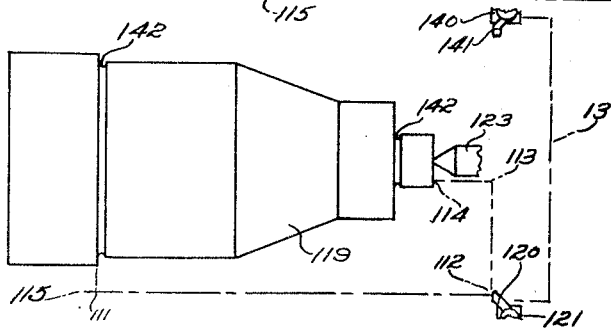
Figure 8 is a plan view of a workpiece as shaped by a tool under the dictates of the pattern controlled tracer assembly of Figure 7.

The limit switches that are controlled by movements of the carriage 12 and cross-slide 13, include a traverse-right limit switch 40, a longitudinal-left limit switch 43, and a traverse-in limit switch 46. The relay means that are actuated by the limit switches and the switch means 64 of the tracer assembly 63 include, a traverse-in relay 31, a cycle relay 32, a feed-left relay 33, a feed-out relay 34, a traverse-out relay 35, a traverse-right relay 36, a longitudinal-brake relay 37, a transverse-brake relay 38, and a time-delay relay 39. These relay means govern the operation of the cross-slide and carriage motors 21 and 24 so that the cross-slide is moved under the dictates of the pattern controlled tracer assembly 63. As shown in the Figure 4, the pattern 62 may have various steps or tapers so that a workpiece 119 being cut on the lathe 11 will have steps or tapers between the various diameters of the shaft or workpiece, as shown in Figure 8.

The limit switches have been shown as double-throw switches, with the traverse right limit switch 40 having an upper contact 41 and a lower contact 42, the left limit switch 43 having an upper contact 44 and a lower contact 45, and the traverse in limit switch 46 having an upper contact 47 and a lower contact 48. The relay means, limit switches and switch means 64 of the tracer assembly 63 are connected by connection means 94 and 95 to the alternating current source 18. A control on-and-off switch 53 is provided in the connection means 94 to control the power supplied to this part of the electrical control system 20. A start cycle button 49 is provided to commence the cycle of operation. The first finger means 67 of the tracer assembly 63 is adapted to actuate the first tracer switch or first switch means 27, and the second finger means 68 is adapted to actuate the second tracer switch or second switch means 28. The first switch means 27 has an on-and-off position with a normally on or closed position, and the second tracer switch 28 is a double-throw switch having an upper contact 29 and a lower contact 30, with the normal position in the upper position.

The first and second drive means that drive the carriage and cross-slide respectively have been described as including an electric motor and a gear reduction unit. In the preferred embodiment of the invention it has been found that small high-speed motors and a high ratio of gear reduction has been practical. Previously such a use of small high-speed motors has been impractical because of the high friction loss in the gear reduction units. In the present invention, this problem has been overcome by utilizing gear reduction units with ball or roller bearings to obtain a very low friction loss, and thus motors of considerably less physical size and inertia have been utilized. For example, an engine lathe formerly requiring a one-half horsepower motor of 600 R. P. M. has had this large half horsepower motor replaced by two motors of only one-quarter horsepower each, one for the carriage and one for the cross-slide. These quarter horsepower motors as utilized in this specific embodiment of the engine lathe are series connected motors of 8000 to 12,000 R. P. M., and consequently have a very small size and inertia. With this high R. P. M., a very high ratio of gear reduction was necessary, but by making a very low friction loss in the gear reduction units, the quarter horsepower motors have been found to develop as great a torque as the formerly used slow half horsepower motor, and have only a fraction of the inertia of the large, slow speed motor. The carriage motor 24 has been shown as including an armature 26 and a field 25, and the cross-slide motor 21 includes an armature 23 and a field 22.

A normally closed cycle stop switch 50 is provided to stop the cycle of operation at any point. The various relay means have a number of contactors, as indicated on the Figure 3, which do the actual controlling of the cross-slide and carriage motors 21 and 24. For convenience, the various contactors have been labeled with a letter suffix to the numeral designating the specific relay in order that the various contactors on the Figures 1 and 2 may be readily identified. The traverse-in relay 31 has contactors 31A, 31B, 31C, 31D, and 31E, the cycle relay 32 has contactors 32A, 32B, 32C and 32D; the feed-left relay 33 has contactors 33A, 33B, 33C, 33D and 33E; the feed-out relay 34 has contactors 34A, 34B, 34C and 4D; the traverse-out relay 35 has contactors 35A, 35B, 35C, 35D, 35E, 35F, and 35G; the traverse-right relay 36 has contactors 36A, 36B, 36C and 36D; the longitudinal-brake relay 37 has contactors 37A, 37B, 37C and 37D; the transverse-brake relay 38 has contactors 38A, 38B, 38C and 38D; and the time-delay relay 39 has a contactor 39A. The time delay relay 39 has a condenser 54 connected thereacross so that energization or de-energization of this relay 39 is delayed until the condenser 54 has charged or discharged.

The power control system of the invention as shown in this preferred embodiment provides a predetermined cycle of operation, which in this specific example of an engine lathe would cause the cross-slide to move in, then leftwardly and outwardly under the dictates of the pattern 62, and then traverse right to the starting point where the cycle is completed and the operation automatically stopped.

The sequence of operation of the entire power control system will be described for one cycle of operation as controlled by the pattern 62.

Figure 7:
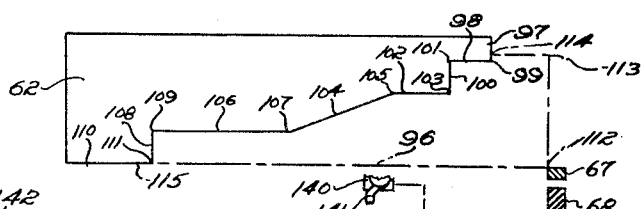
Figure 7 is a plan view of a pattern and tracer assembly showing a predetermined cycle of operation.

The tracer assembly 63 is adapted to have the two finger means 67 and 68 mounted in alignment parallel to the movement of the cross-slide. When the two finger means 67 and 68 are operatively contacting a surface of the template that is also aligned with this direction of movement of the cross-slide, the electrical control system 20 provides for a traverse-out or high-speed in the outward direction; that is, toward the front of the lathe. The first and second finger means 67 and 68 are positioned such that the second finger means 68 is in front of the first finger means and therefore by this traverse-out movement of the cross-slide, the second finger means 68 is relieved from operative contact with the surface of the template 62 before the first finger means 67 is so relieved. Upon so doing, a signal is received by the electrical control system 20 to change from a traverse-out to a feed-out speed condition, which is a considerably slower speed than the traverse speed. When the first finger means 67 has been relieved from operative contact with this surface of the template 62, the electrical control system 20 receives a signal that causes the cross-slide to stop movement and the carriage 12 will then feed left at a slow rate of speed to cut a new diameter as gauged by a step in the template 62. The Figure 7 shows a plan view of the template 62 and the first and second finger means 67 and 68, and the Figure 8 shows a workpiece 119 as cut by a tool 120 under the dictates of the tracer assembly 63. The pattern 62 has a first surface 97, a second surface 98, a shoulder 99 between the first and second surfaces, a third surface 100, a shoulder 101 between the second and third surfaces, a fourth surface 102, a third shoulder 103 between the third and fourth surfaces, a taper surface 104, a fourth shoulder 105 between the fourth surface 102 and the taper surface 104, a fifth surface 106, a shoulder 107 between the taper surface 104 and the fifth surface 106, a sixth surface 108, a sixth shoulder 109 between the fifth and sixth surfaces 106 and 108, a seventh surface 110, and a shoulder 111 between the sixth and seventh surfaces 108 and 110. The cycle of operation will start with the first and second finger means 67 and 68 positioned at a point 112, which point 112 is on a line that is a continuation of the seventh surface 110, and is to the right of the line of the first surface 97. This position is similar to that shown in the Figure 4, and it is therein shown that the traverse right limit switch 40 is in the actuated position, that is, in the down position contacting the contact 42. The cycle of operation will be explained by the aid of reference to steps A to H, which steps indicate changes in the electrical control system 20.

To commence the cycle of operation, or step A, the switch 60 is closed thereby energizing the transformer 59. This supplies the first and second rectifier devices 14 and 15 with alternating current power permitting them to furnish a rectified voltage across the lines or connection means 75 and 76, and 79 and 80. Voltage is also supplied by the transformer 59 to the third rectifier device 92, that supplies a rectified voltage to energize the time-delay relay 39. Step B is accomplished when the control on-and-off switch 53 is closed to supply voltage to the tracer switches, limit switches, and relay means. When the control on-and-off switch 53 is closed, the transverse brake relay 38 is energized closing contactors 38A and 38B and opening contactors 38C and 38D to reverse the connections of the field 22 with respect to the armature 23. The traverse right-limit switch 40 is in the actuated position because the carriage 12 is in its rightmost position, and this provides voltage at the start button 49. Step C commences upon actuation of the start button 49, which energizes the traverse-in relay 31. Contactor 31A is a holding contactor for the traverse-in relay 31 to hold in this relay 31 even after the start button 49 is released to the off position. Contactor 31D opens to avoid a short circuit across the lines or connection means 75 and 76 supplying power to the cross-slide motor 21. Contactor 31C closes to run the cross-slide motor 21 in a reverse direction, which is inwardly, since the actuation of the transverse brake relay 38 has caused the field to be reversed with respect to the armature 23. Contactor 31B opens to give a high bias to the third thermionic tube 51, and consequently a high output of the first rectifier device 14, so that the cross-slide motor 21 runs at a high speed, or traverse-in. Step D begins at the point 113 when the traverse-in limit switch 46 is actuated by a stop on the carriage 12. This means that the traverse-in limit switch 46 is thrown from the upper contact 47 to the lower contact 48. In actuating the traverse-in limit switch 46, the traverse-in relay 31 is de-energized. The cycle relay 32 is energized by having the traverse-in limit switch 46 contact the lower contact 48. Contactor 32B closes as a holding contactor to hold the cycle relay 32 in an energized state. The cycle stop switch 50 is normally closed, so that the feed-left relay 33 becomes energized. The de-energization of the traverse-in relay 31 causes the contactor 31C to open and contactor 31D to close to effect a dynamic braking of the cross-slide motor 21. This is accomplished because the motor 21 is disconnected from the lines 75 and 76, and the field 22 is connected across the armature 23 providing an impedance for dissipation of the power developed by the generator action of the armature 23. The energization of the cycle relay 32 causes the contactor 32A to open so that no accidental closing of the start button 49 will cause energization of the traverse in relay 31. The contactor 32D is therefore opened to cause the time-delay relay 39 to be de-energized after the condenser 54 has discharged. The contactor 32C is closed to permit a bias to be established on the fourth thermionic tube 52. The energization of the feed-left relay 33 causes the contactor 33A to open so that the longitudinal-brake relay 37 will not become energized upon return of the traverse right-limit switch 40 to the upper contact position 41. The contactor 33B opens to de-energize the transverse brake relay 38, which causes the field 22 to be connected in a forward manner with respect to the armature 23 of the cross-slide motor 21. This causes dynamic braking of the motor 21, because the braking current then opposes the normal flow of current through the field 22. Contactor 33C closes to permit power to flow from the lines 79 and 80 to drive the carriage motor 24 in a forward direction, that is, to move the carriage in a leftwardly longitudinal movement. The carriage motor 24 is driven at a slow speed, since the contactor 32C is closed giving a low bias condition to the fourth thermionic tube 52 with a consequent low output of the second rectifier device 15. The contactor 33D opens to prevent a short across the lines 79 and 80. The contactor 33E opens, so that when the time-delay relay 39 de-energizes, the energizing of the feed-out relay 34 will not cause the cross-slide motor 21 to run. Under these conditions of the step D, the carriage motor 24 is driven at a slow speed leftwardly, or feed-left, during which time the traverse-right limit switch 40 is de-actuated so that it contacts the upper contact 41. Step E commences when the feed-left movement of the carriage causes both finger means 67 and 68 to contact the first surface 97 of the template 62, which happens at the point 114. Upon both finger means 67 and 68 contacting the pattern 62, both tracer switches 27 and 28 are actuated so that the first tracer switch 27 opens and the second tracer switch 28 is actuated so that it contacts the lower contact 30. With the first tracer switch 27 open, the feed-left relay 33 is deenergized, closing contactor 33D and opening contactor 33C to remove the power supplied by lines 79 and 80 to the carriage motor 24. Contactor 33A is closed to energize the longitudinal brake relay 37. Energization of the longitudinal brake relay 37 reverses the field 25 with respect to the armature 26 of the carriage motor 24, and therefore in combination with the closing of the contactor 33D effects a dynamic braking of the carriage motor 24. The second tracer switch 28 being in the actuated position contacting the lower contact 30, causes the traverse-out relay 35 to be energized. This opens the contactor 35A to keep the transverse brake relay 38 de-energized. Contactor 35B closes to energize the time-delay relay 39 after the condenser 54 has charged to the pull-in point of this time-delay relay 39. The contactor 35C opens to disconnect the feed-out tachometer 55 in the compensating circuit 71. Contactor 35D opens to give a high bias condition to the third thermionic tube 51, with a consequent high output of the first rectifier device 14. The contactor 35F opens and contactor 35E closes to put the cross-slide motor 21 across the line. The resultant condition of this step E is that with a high output of the first rectifier device 14, the cross-slide motor 21 is driven at a high speed in a forward direction, or outward direction, which has been labeled traverse-out. Step F commences at the shoulder 99 where the second finger means 68 is relieved from operative contact with the first surface 97 by dropping off or passing beyond this shoulder 99. The second tracer switch 28 is permitted to return to its normal position in contact with the upper contact 29. The traverse-out relay 35 is thereupon de-energized, and the contactor 35A closes to energize the transverse-brake relay 38 which dynamically brakes the cross-slide motor 21 in the manner previously described. Contactor 35B opens, so that the time-delay relay 39 de-energizes upon discharge of the condenser 54. The contactor 39A closes upon de-energization of the time-delay relay 39, which causes the feed-out relay 34 to be energized. Contactor 34A opens to release the dynamic braking on the cross-slide motor 21. Contactor 34B closes and contactor 34C opens to connect the cross-slide motor 21 to the lines 75 and 76. Because the traverse-out relay 35 has been de-energized, the contactors 35C and 35D close, giving a low bias condition on the third thermionic tube 51 of the first rectifier device 14. The resultant condition obtained with this step F is that the cross-slide motor is dynamically braked to a stop and then continues at a slow rate of speed determined by the bias setting of the first variable potentiometer 86, which condition has been labeled "feed-out." This feed-out speed condition is very slow so that extreme accuracy can be obtained in sizing the dimension at the shoulder 99. The step G commences when the first finger means 67 is relieved from operative contact with the first surface 97 by dropping off the shoulder 99. This permits the first tracer switch 27 to return to the normal or closed position. The feed-left relay 33 is energized, which causes the contactor 33E to open to stop the cross-slide motor 21. The conditions then existing for the step G are from then on similar to the conditions existing under the step D, where feed-left of the carriage is obtained. Therefore, the conditions under step D would be duplicated for the second surface 98 until the tracer assembly 63 reaches the shoulder 101, when the third surface 100 would actuate both finger means 67 and 68 to cause conditions similar to those under step E to be established. Traverse-out of the cross-slide 13 would then be accomplished until near the shoulder 103, when the conditions under step F would be accomplished when the second finger means 68 drops off the shoulder 103 to provide a feed-out, and finally a feed-left condition when the first finger means 67 drops off this shoulder 103. Feed-left of the carriage 12 would continue along the fourth surface 102 until the shoulder 105 is reached. This shoulder is at the beginning of the taper surface 104, and since this taper surface 104 is not parallel with the alignment of the first and second finger means 67 and 68, only the first finger means 67 will operatively contact this taper surface 104. This condition is then similar to conditions existing under step F, where the second finger means 68 is not actuated, and the first finger means 67 is actuated. The first tracer switch 27 is then opened, with the second tracer switch 28 in the normal position, that is, contacting the contact 29. This provides for a feed-out of the cross-slide 13. It will be evident that such a feed-out movement, which is not parallel with the taper surface 104, will quickly result in the first finger means 67 being removed from operative contact with this taper surface 104 and therefore returning to the normal position, to return the first tracer switch 27 to its normally closed position. This means that both the first and second tracer switches 27 and 28 are in the normal position, which results in the electrical condition as under the steps D and G wherein feed-left is accomplished of the carriage motor 24. In only a short space of time the first finger means 67 will again operatively contact this taper surface 104 to actuate the first tracer switch 27 and again cause a feed-out condition. Thus it will be seen that the taper surface 104 causes alternate feed-left and feed-out in minute steps to form this taper surface 104. When the shoulder 107 is reached, the conditions then existing will be similar to those conditions under the steps D and G, namely, feed-left. The pattern controlled tracer assembly 62 will so govern the electrical control system 20 so that at each right-angled shoulder, there is traverse-out, then feed-out and finally feed-left on the longitudinal surface. The sixth surface 108 would ordinarily be used to remove the tool from the contact with the workpiece, and the seventh surface 110 would cause a feed-left condition of the carriage so that the left-limit switch 43 is actuated so that it contacts the lower contact 45, rather than the upper contact 44. The cycle relay 32 thereupon becomes de-energized, and also the feed-left relay 33 is de-energized. This causes the contactor 33A to close, to energize the longitudinal brake relay 37. The energization of the longitudinal brake relay 37 causes the connections of the field 25 of the carriage motor 24 to be reversed relative to the armature 26. The actuation of the left-limit switch 43 causes energization of the traverse right relay 36, and contactor 36B closes as a holding contactor to hold the traverse right relay 36 energized. Contactor 36A opens so that the closing of the contactor 32A will not permit the traverse-in relay 31 to be energized. The contactor 36C closes and contactor 36D opens to run the carriage motor 24 in a reverse direction, that is, a longitudinal direction to the right, since the field 25 has been reversed by the energization of the longitudinal brake relay 37. The contactor 32C opens, to cause a high bias condition on the fourth thermionic tube 52, with a consequent high output of the second rectifier device 15, thereby permitting the carriage motor 24 to be run at high speed to provide a traverse right of this carriage 12. Since the three relays feed-left, feed-out and traverse-out 33, 34 and 35 are de-energized, the transverse brake relay 38 is energized to reverse the field 22 of the cross-slide motor 22 with respect to the armature 23. Step I commences at point 112 when the traverse-right limit switch 40 is actuated by movement of the carriage 12. By actuation of the traverse-right limit switch 40, the longitudinal brake relay 37 is de-energized, and the traverse-right relay 36 is de-energized to reverse the field 25 of the carriage motor 24, and to open contactor 36C and close contactor 36D to dynamically brake the carriage motor 24. The traverse-right limit switch 40 is actuated at the point 112, and this completes the cycle of operation. When the control on-and-off switch 53 is opened, the transverse brake relay 38 becomes de-energized, permitting the field 22 to be forwardly connected with the armature 23.

The cycle stop button 50 is provided to stop the cycle of operation at any point of leftwardly or outwardly movements. The cycle stop button 50 will not stop the operation during traverse-in or traverse-right, but does stop leftward or outward movements, because it will prevent energization, or cause de-energization, of the feed-left, feed-out or traverse-out relays 33, 34, and 35.

In the preferred embodiment of the invention, the first gear reduction unit 57 is provided with a different set of gearing ratios for right and left movements. This was done because the traverse-right speed was considered too slow, even with full output of the second rectifier device 15, commensurate with the speed of the entire cycle of operation. A three-to-one change in gear ratio was obtained in the traverse-right over the gear ratio for the feed-left, by having an idler gear held in place by spring means for the feed-left direction of rotation, with the centrifugal force of the reversal of the direction of rotation causing the idler gear to mesh with another set of gears having a gear reduction ratio only one-third as great as the gear-reduction ratio effected with the feed-left movement.

Figure 2:
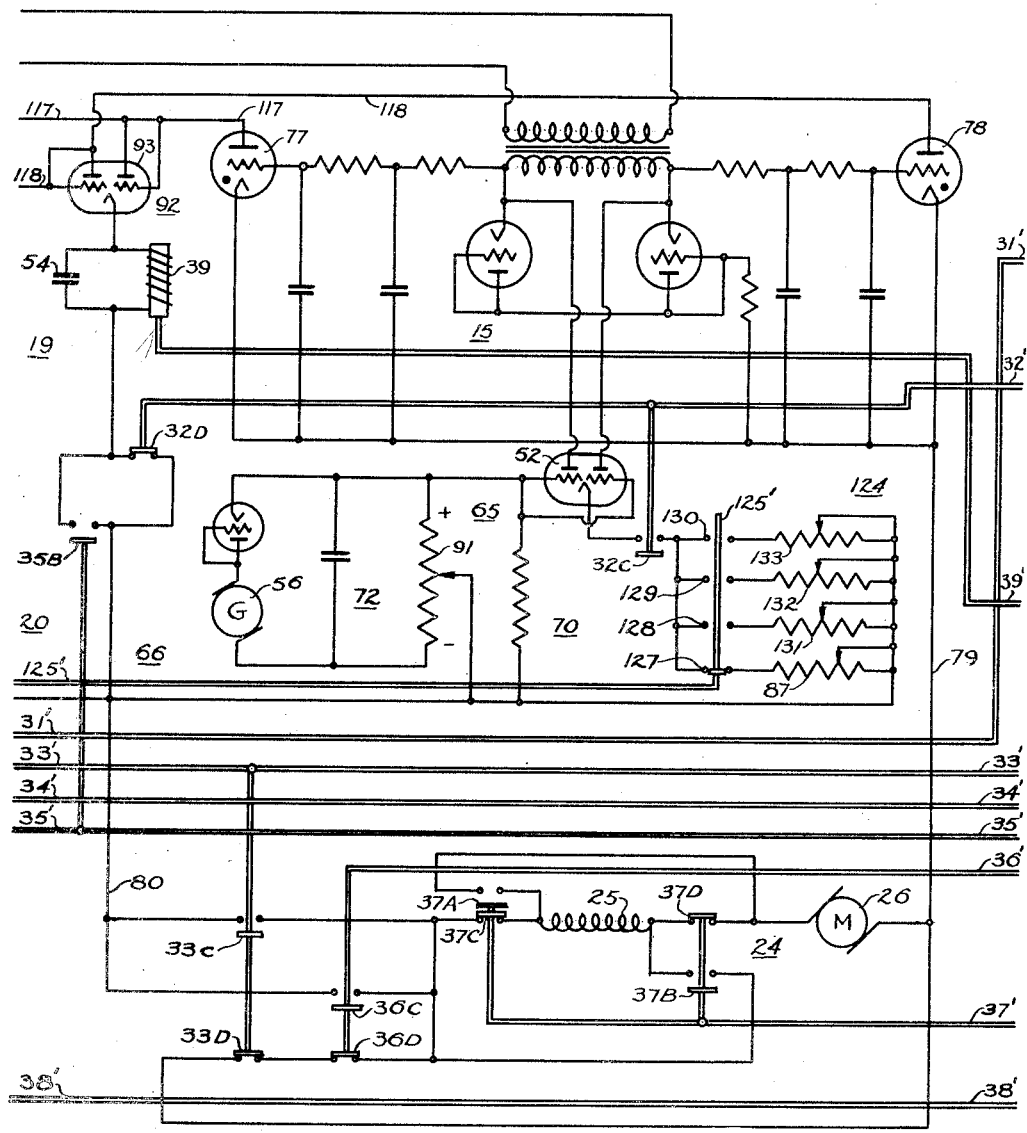
Figure 2 is a similar circuit diagram for another series electric motor powered from a controllable rectifier system.

An additional feature incorporated into the entire system is an automatic feed step-up circuit 124 that permits a substantially constant rate of material removal from the workpiece 119 by the tool 120. As shown in the Figure 7, the pattern 62 has various steps, or surfaces 98, 102, 106 and 110 that determine different diameters on the workpiece 119. It will be evident that if the speed of rotation of the workpiece 119 is maintained constant, then the surface speed of the workpiece 119 relative to the tool 120 will vary over a wide range with the various diameters being cut. In this invention, a solution to this problem has been effected by providing different rates of feed-left movement of the carriage that vary in accordance with the diameter of the shoulder or surface being cut, so that a fairly uniform rate of material removal is maintained. This automatic feed step-up circuit, as best shown in Figures 1 and 2, includes a step relay 125, an actuating contactor 35G, first, second, third and fourth step relay contactors numbered 127, 128, 129 and 130, respectively and first, second, third and fourth step relay potentiometers numbered 87, 131, 132 and 133, with the first step relay potentiometer 87 the same as the second variable potentiometer 87 in the second biasing circuit 79. The actuating contactor 35G and the step relay 125 are serially connected across the first and second connection means 75 and 76, to obtain power from the first rectifier device 14 that principally supplies power to the cross-slide motor 21. The step relay 125 is any form of relay that has a series of contactors that are consecutively closed as the step relay 125 changes its position. Each time the step relay 125 is energized, a different contactor is closed, and the previous contactor is opened. In this case, the actuating contactor 35G is shown as a normally open contactor of the traverse out relay 35. This means that each time that the traverse-out relay 35 is energized, the actuating contactor 35G will be closed to energize the step relay 125. The first, second, third and fourth step relay contactors 127, 128, 129 and 130 are each connected in series with the first, second, third and fourth step relay potentiometers 87, 131, 132 and 133, respectively. These are shown in the Figure 2, wherein the step relay potentiometers and their respective step relay contactors are connected in parallel across the second variable potentiometer 87, which is also labeled the first step relay potentiometer 87. The first step relay contactor 127 is shown as being normally closed, and thus the first step relay potentiometer 87 is connected in the circuit to provide a bias for the feed left condition existing between the points 113 and 114. The next time that the traverse-out relay 35 is energized will be on the next right angle shoulder and will cause the step relay 125 to be energized to close the second step relay contactor 128 and open the first step relay contactor 127, so that under the next feed left condition the second step relay potentiometer 131 is connected in the circuit to furnish the bias to the fourth thermionic tube 52. This second step relay potentiometer 131 can be set to give a different bias than that furnished by the first step relay potentiometer. This different bias produces a different output of the rectifier device 15 with a consequently different speed of the carriage motor 24. A like change will take place at the next right angle shoulder; that is, the surface 100, so that during the time that the traverse-out relay 35 is again energized, the step relay 125 will be energized to cause the third step relay contactor 129 to be closed and the second step relay contactor 128 to be opened. This means that when the surface 102 is governing the tracer assembly 63, the third step relay potentiometer 132 will govern the bias of the carriage motor 24. A fourth step relay potentiometer 133 may in a similar manner control the rate of feed-left for the fifth surface 106, and additional step relay contactors and potentiometers may be added for governing the feed-left rate for each succeeding diameter of the workpiece 119. Upon completion of the cycle, some means is provided for resetting the step relay, and a reset coil 134 has been shown for this purpose, which is actuated by the release contact 135 on this step relay 125. This automatic feed step-up circuit 124 has an on-off switch 136 having a first contactor 137 and a second contactor 138. The first contactor 137 is normally closed for the on position of the on-off switch 136, and the second contactor 138 is normally open for this on condition of the on-off switch 136. Bridging the second contactor 138 is a normally open contactor 31E of the traverse-in relay 31. Each time the traverse-in relay 31 is actuated, which is at the beginning of each cycle of operation, the contactor 31E will be closed to reset the step relay 125 so that it may begin its stepping cycle. With the on-off switch 136 in the off position, the step relay 125 will never be energized, and the reset coil 134 will be energized to reset this step relay 125 because the second contactor 138 of the on-off switch 136 is closed.

This automatic feed step-up circuit may be utilized in many different circumstances, for small or large diameter shafts, or for final or roughing cuts. The various step-relay potentiometers can be set to vary the longitudinal feed rate of the carriage in accordance with different surface cutting speeds and depths of cut.

If the shaft being turned is of small diameter wherein the entire cut for each of the various diameters may be taken from the original straight bar stock, then the depth of cut for the small diameter steps will be greater than the depth of cut for the successively larger diameter steps. For such a case, the rate of longitudinal feed would then need to be increased for each increasingly larger diameter step, in order that constant material removal may be maintained. If the shaft being turned is large, and several roughing cuts must be taken before the final cut is made, then these roughing cuts would all be approximately of the same depth that would be on increasingly smaller diameters, with a consequently lower surface cutting speed, because each cut would reduce the diameter of the workpiece. For such a case, the rate of longitudinal feed should also be stepped up for each successively smaller diameter cut to maintain constant material removal. After the roughing cuts have been made, a final cut might then be made on all the various diameters of the step-shaft. This final cut would preferably be one of uniform depth of cut for all diameters, and since it is customary to start on the smallest diameter, then the rate of longitudinal feed should be decreased for each successively larger diameter step since the surface cutting speed would be correspondingly increased.

An additional feature of this electrical control system is an automatic cycle step circuit 139 that permits automatic interruption of the given cycle of operation at predetermined similar points so that an additional operation foreign to the cycle of operation may be performed during this interrupted period. An example of such a use for such an interrupted period during the cycle of operation is diagrammatically shown in Figure 4, that shows a second tool holder 140 holding a second tool 141. This second tool holder 140 is at the back of the workpiece 119, and a suggested use for such a tool would be to cut a slight neck 142 at each shoulder of the workpiece 119 as a grinding relief, or in other words, to give a clearance between the right angled surfaces so that a grinding tool may properly be used on the various diameters of the workpiece 119. This neck 142 in the workpiece 119 as a grinding relief can be cut by the second tool 141 during the interrupted period of the automatic cycle of operation. The automatic cycle stop circuit 139 that accomplishes this automatic stopping of the cycle of operation includes a feed-out contactor 34D, a feed-start button 143, a cycle on-off switch 144, and first and second connection means 145 and 146 to connect the feed start button 143 and the cycle on-off switch 144 in parallel with the feed out contactor 34D.

The cycle on-off switch 144 is normally closed, and in such normally closed position it causes the predetermined cycle of operation to be uninterrupted, as previously described. By opening this cycle on-off switch 144, the automatic cycle stop circuit 139 becomes operative. The feed-out contactor 34D is connected in series in the line that energizes the feed-out relay 34. The feed-out contactor 34D is a holding contactor for the feed-out relay 34, and is a normally open contactor. Since the contactor 34D is a normally open contactor, the feed-out relay 34 will not be energized upon the closing of the time delay contactor 39A as was formerly stated in the above description. This means that after the traverse-out movement of the cross-slide, the cycle of operation will be interruped because the feed-out relay 34 will not be energized since the contactor 34D is open. This provides the aforementioned interruption period during the cycle of operation, and therefore the necking operation by the second tool 141 may be accomplished during this interrupted period. After the necking operation has been accomplished, the predetermined cycle of operation may again be started by pressing the feed start button 143. This will cause energization of the feed-out relay 34, which closes the contactor 34D as a holding contactor to keep the feed-out relay 34 energized until the first finger means 67 is relieved from operative contact with the shoulder that it is scanning at that particular time. The cycle will then continue until the next shoulder, whereupon the feed-out relay will again not be energized after the closing of the time delay relay contactor 39A and so cause another interrupted period in the predetermined cycle of operation. The cycle on-off switch 144 may be opened or closed, and must be opened in order to accomplish the interrupted period of the cycle of operation as just previously described. Should the cycle on-off switch 144 be closed, the automatic cycle stop circuit 139 is rendered inoperative, as this cycle on-off switch 144 then shunts the holding contactor 34D, and causes the predetermined cycle of operation to continue uninterrupted as described in the body of the specification.

At the beginning of the explanation of the preferred embodiment of the invention, the statement was made that this preferred embodiment was being shown as being used with an engine lathe, although it was to be understood that this was not a limitation, but merely an example. The tracer assembly as shown may easily be used to control three speed conditions of the carriage of the lathe, rather than the cross-slide of the lathe. The Figure 17 shows a simplified plan view of the pattern, the first and second finger means, and a faceplate workpiece being cut in accordance with the pattern 62. The first and second finger means 67 and 68 are shown as being positioned at right angles to their position in Figure 7, and thus the first and second finger means are now adapted to provide a three-speed condition to the carriage 12 of the lathe 11, rather than to the cross-slide 13. In Figure 17, the first and second finger means 67 and 68 are aligned in a direction parallel to the movement of the carriage 12 rather than aligned parallel to the movement of the cross-slide 13. This three-speed condition of the carriage 12 is useful where the workpiece 147 is what is known as a faceplate, with the important dimensions to be accurately measured being those dimensions between successive faces of the various diameters of the workpiece 147.

The Figure 18 shows how the control system of the present invention may be adapted for use in a step-boring operation. For this operation, the first and second finger means 67 and 68 are reversed, or positioned 180 degrees from the position shown in the Figure 7. The pattern 62 necessarily has the various steps or variations on the back side of this pattern 62; that is, the side away from the operator of the lathe. With the first and second finger means 67 and 68 positioned relative to the pattern 62 as shown in the Figure 18, such a step-boring operation of a workpiece 148 may readily be accomplished by the tracer assembly 63 as disclosed in this specification.

The invention may be carried one step further, and the electrical control system may be utilized for controlling three speed conditions of both the carriage and the cross-slide of the lathe. The tracer assembly 63 need be modified only slightly to provide for this increased flexibility of the entire system. The Figures 11, 12 and 13 show the side, front and plan views of a modified tracer assembly 63 that incorporates a third switch means 149 therein that is adapted to be actuated by the second finger means 68. This third switch means 149 could be actuated by the first finger means 67 with just as satisfactory results, and therefore this embodiment is shown merely by way of example and not as a limiting feature.

With this modification, the tracer assembly 63 is adapted to have four positions of movement rather than the three positions as shown under the preferred embodiment of the invention. The first position of movement is best shown in the front view of Figure 12, with the second, third and fourth positions of movement shown in the Figures 14, 15 and 16 respectively. The third switch means 149 is adapted to provide a feed-left slow, or slow-speed movement to the longitudinal leftward movement of the carriage 12. The Figure 12 shows the first and second finger means 67 and 68 as not contacting the pattern 62, which, as shown in the preferred embodiment of the invention, provides for feed-left of the carriage 12. The Figure 14 shows the second position of movement of the tracer assembly 63, wherein both first and second finger means 67 and 68 have contacted the pattern 62. This second position actuates the first switch means 27 to its second condition, actuates the third switch means 149 to its second condition, but does not actuate the second switch means 28. Under this second position of the tracer assembly 63, the electrical circuit receives a changed condition that causes feed-left slow of the carriage 12 to be established. This feed-left slow moves the tracer assembly 63 still further relative to the pattern 62 and eventually a third position of the tracer assembly 63 is effected as shown in the Figure 15. This third electrical condition causes the first switch means 27 to remain in its second condition, the third switch means 149 to remain in its second condition, and the second switch means 28 to be actuated to its second condition. This third position of the tracer assembly 63 provides for traverse out of the cross-slide 13 with an arresting of the movement of the carriage 12, as previously described in the preferred embodiment. A fourth position of the tracer assembly 63 is shown in Figure 16 when the second finger means 68 is no longer in operative contact with the pattern 62, while the first finger means 67 does remain in operative contact with the pattern 62. This fourth position of the tracer assembly 63 causes the second and third switch means 28 and 149 to return to their first electrical condition, with the first switch means remaining in the second electrical condition. This fourth position of the tracer assembly 63 provides for feed-out of the cross-slide 13, as hereinbefore described.

Figure 9:
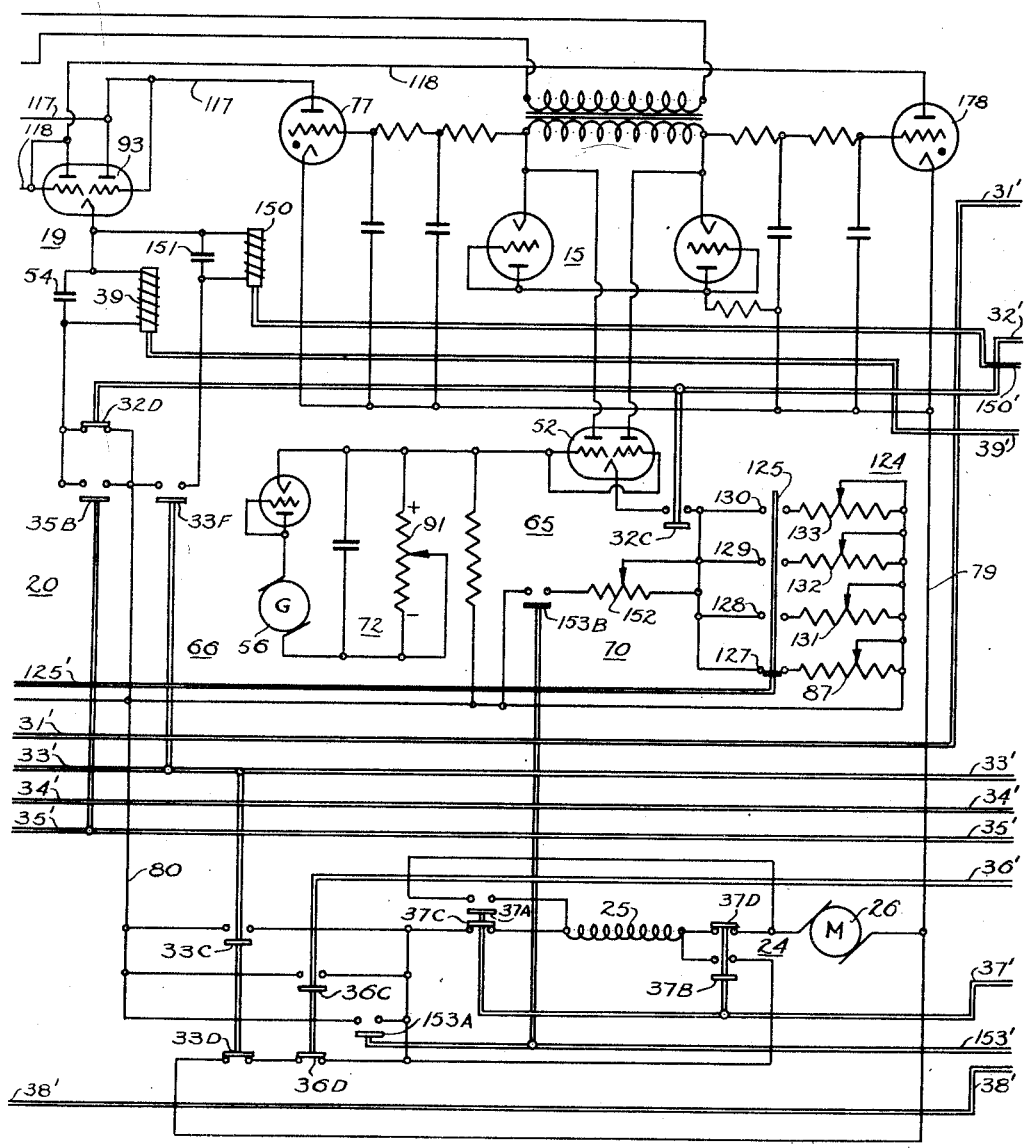
Figure 9 is a circuit diagram of a control system which circuit is a modification of the circuit of Figure 2.

Under this modification of the tracer assembly 63 wherein a third switch means 149 is added to provide three speed conditions to the carriage 12, the circuit diagram would be quite similar to the preferred embodiment as hereinbefore described, with certain changes. The circuit of the cross-slide motor 21, which is shown in Figure 1, may remain the same as before, but the circuit for the carriage motor 24 as shown in Figure 2 will have the slight modifications as shown in the Figure 9. The electrical circuit shown in Figure 3 for the preferred embodiment of the invention, need have only a few modifications as shown in the Figure 10 in order to utilize the third switch means 149. In the carriage motor circuit of Figure 9, a second time delay relay 150 is provided with a condenser 151 connected thereacross to provide the requisite time delay. This second time delay relay is connected in the circuit of the third rectifier device 92, in parallel with the first time delay relay 39. A normally open contactor 33F of the feed-left relay 33 is provided in the energization circuit of this second time delay relay 150. The second time delay relay 150 actuates one normally closed contactor 150A.

In the second biasing circuit 70, a third variable potentiometer 152 is provided in the cathode-grid circuit of the fourth thermionic tube 52 in order to provide a separate biasing arrangement for the feed-left slow condition of the carriage 12. In series with this third variable potentiometer 152 is a feed-left slow normally open relay contactor 153B. In the circuit to the carriage motor 24 an additional contactor 153A is provided to connect this carriage motor 24 across the lines 79 and 80. This contactor 153A is a normally open contactor of the feed-left slow relay 153.

In the Figure 10, which is a modification of the circuit of Figure 3, the third switch means 149 has been added in the switch means 64 of the tracer assembly 63. The first, second and third switch means 27, 28 and 149 have been placed in series in this modification but still control the feed-left, the feed-out, and the traverse-out relays 33, 34 and 45, respectively. The third switch means 149 has an upper contact 154 and a lower contact 155. With the third switch means 149 in the first position in contact with the upper contact 154, the first, second and third switch means are connected in series, and with the third switch means 149 in the second position, that is, in contact with the lower contact 155, the circuit is made through the time delay relay contactor 150A to a feed-left slow relay 153. The feed-left slow relay 153 has three contactors 153A, 153B and 153C. The contactors 153A and 153B are normally open contactors and their use in the circuit of Figure 9 has previously been described. The contactor 153C is a normally closed contactor and is located in the energization circuit for the longitudinal brake relay 37 to prevent energization of this longitudinal brake relay 37 when the feed-left slow relay is actuated. The feed-left relay 33 has an additional normally open contactor 33F which has been described in conjunction with the circuit of Figure 9. The operation of this modified circuit will be quite similar to the operation of the preferred embodiment of the invention, in that traverse-out, feed-out and feed-left of the tracer assembly 63, and consequently the tool 120, will be provided under the dictates of the pattern 62. The modification will provide for a feed-left slow condition between the feed-left and the traverse-out movement as described in the preferred embodiment. The modification of the tracer assembly 63, wherein it has four positions of movement relative to the pattern 62, provides that in the first position of movement, that is, when the first and second finger means 67 and 68 are not in contact with the pattern 62, then the first, second and third switch means are all in their normal positions or electrical conditions as shown in the Figure 10, which will energize the feed-left relay 33. When the first and second finger means operatively contact the pattern 62 to move the tracer assembly 63 to its second position of movement, the first and third switch means will be thrown to the second position. This second electrical condition is that the first switch means 27 is open and the third switch means 149 is thrown so that it contacts the lower contact 155, thus energizing the feed-left slow relay when the second time delay relay contactor 150A closes.

The second time delay relay 150 is energized when the carriage is in the feed-left condition, since the contactor 33F thereupon closes. When the first and third switch means 27 and 149 are actuated to their second positions upon contacting the pattern 62, the feed-left relay 33 is thereby de-energized, but the feed-left slow relay 153 cannot be energized immediately since the contactor 150A of the time delay relay 150 is still open because of the charge on the condenser 151. During this interval of time that it takes for the condenser 151 to discharge, the longitudinal brake relay 37 will be actuated because the contactor 33A of the feed-left relay 33 will be closed. This actuation of the longitudinal brake relay 37 causes the carriage motor 24 to be braked to any predetermined value, and in this invention the preferred amount of braking will be that the carriage motor 24 is braked completely to a stop during this time delay interval. When the second time delay relay 150 becomes de-energized to close the contactor 150A, the feed-left slow relay 153 is thereby energized to provide the feed-left slow condition of the carriage motor 24. The energization of this feed-left slow relay 153 closes the contactor 153A to thereby energize the carriage motor 24 at a value determined by the setting of the third variable potentiometer 152, since the contactor 153B is likewise closed. The contactor 153C opens to prevent any energization of the longitudinal brake relay 37. This feed-left slow condition causes the carriage 12 to move leftwardly, and therefore the third position of the tracer assembly 63 will eventually be reached, as shown in the Figure 15. This third position of the tracer assembly 63 causes the second switch means 28 to be actuated so that it contacts the lower contact 30, thereby de-energizing the feed-left slow relay 153 and energizing the traverse-out relay 35. From then on, the cycle of operation will be substantially the same as that described in the preferred embodiment above.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination with an alternating current source and a machine tool having a tool and a base, the provision of a power system comprising, first drive means for driving the tool along a first path relative to said base, second drive means for driving the tool along a second path relative to said base at an angle to said first path, said first and second drive means each including an electric motor, a rectifier device deriving power from said alternating current source and supplying rectified power to both said first and second electric motors, said second drive means having three definite speed conditions, and an electrical control system including a pattern, a tracer assembly for scanning said pattern, switch means controlled by said tracer assembly for governing the operation of said first and second drive means, and relay means actuated by said switch means for effecting the operation of the electrical control system.

2. In combination with an alternating current source and an engine lathe having a carriage and a cross-slide, the provision of a power system comprising, first drive means for driving the carriage for right and left longitudinal movements, second drive means for driving the cross-slide for in and out transverse movements, said first drive means including a first series motor and a first gear-reduction unit, said second drive means including a second series motor and a second gear reduction unit, a grid-controlled rectifier system deriving power from said alternating current source and supplying rectified alternating current power to both said first and second series motors, and an electrical control system including a pattern, a tracer assembly for scanning said pattern, switch means controlled by said tracer assembly for governing the operation of said first and second drive means, variable biasing means for varying the output of the said rectifier system, and compensating means for maintaining the rectifier voltage output constant at a predeterminable setting for varying load conditions.

3. A control system for a lathe having a carriage with a cross-slide thereon, said control system controlling the movement of said carriage and cross-slide, said control system including, first drive means for effecting right and left longitudinal movements of said carriage, second drive means for effecting in and out transverse movements of said cross-slide, said drive means each including a series electric motor and a gear reduction unit therefor, said second drive means having three definite speed conditions, first and second actuating means for independently operating, respectively, said first and second drive means, said second actuating means having switch means with three electrical conditions for establishing said three speed conditions of said second drive means, and first and second dynamic braking means for dynamically braking, respectively, said first and second drive means.

4. In combination with an engine lathe having a carriage and a cross-slide, the provision of a power system comprising, first drive means for driving the carriage for right and left movements, second drive means for driving the cross-slide for in and out movements, said first drive means including a first series motor and a first gear-reduction unit, said second drive means including a second series motor and a second gear-reduction unit, an alternating current source, a grid-controlled rectifier system deriving power from said alternating current source and supplying rectified alternating current power to both said first and second series motors, and an electrical control system including a template, a tracer assembly for scanning said template, and switch means controlled by said tracer assembly for governing the operation of said first and second drive means, said grid controlled rectifier including a full-wave rectifier circuit and variable biasing means for varying the power output of said grid-controlled rectifier, said switch means having a first and a second position, said second position governing said electrical control system to provide an outward movement of said cross-slide, and said first position governing said electrical control system to provide dynamic braking to said second series motor to terminate said outward movement.

5. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said electrical control system including, a tracer assembly for scanning said pattern to obtain intelligence therefrom, switch means controlled by said tracer assembly, and relay means actuated by said switch means for affecting the operation of said electrical control system.

6. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit said electrical control system including, a tracer assembly for scanning said pattern to obtain intelligence therefrom, switch means controlled by said tracer assembly, and relay means actuated by said switch means for affecting the operation of said electrical control system.

7. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said second drive means having a transverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross-slide, relay means actuated by said switch means and said limit switches for affecting the operation of the electrical control system, variable biasing means for varying the output of the said rectifier system, and compensating means for maintaining the rectifier voltage output constant at a predeterminable setting for varying load conditions.

8. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said second drive means having a traverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross-slide, relay means actuated by said switch means and said limit switches for affecting the operation of the electrical control system, variable biasing means for varying the output of said rectifier system, and compensating means for maintaining the rectifier voltage output constant at a predeterminable setting for varying load conditions, said tracer assembly including first and second scanning means, said switch means including a first and a second switch device actuated by said first and second scanning means, respectively, in accordance with the intelligence obtained from said pattern.

9. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said second drive means having a traverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross-slide, relay means actuated by said switch means and said limit switches for affecting the operation of the electrical control system, variable biasing means for varying the output of said rectifier system, and compensating means for maintaining the rectifier voltage output constant at a predeterminable setting for varying load conditions, said tracer assembly including first and second scanning means, said switch means including a first and a second switch device actuated by said first and second scanning means, respectively, in accordance with the intelligence obtained from said pattern, said first and second limit switches limiting, respectively, the right and left movements of said carriage relative to said lathe, said third limit switch limiting the inward movement of said cross-slide relative to said carriage.

10. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said second drive means having a traverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross-slide, relay means actuated by said switch means and said limit switches for affecting the operation of the electrical control system, variable biasing means for varying the output of said rectifier system, and compensating means for maintaining the rectifier voltage output constant at a predeminable setting for varying load conditions, said tracer assembly including first and second scanning means, said switch means including a first and a second switch device actuated by said first and second scanning means, respectively, in accordance with the intelligence obtained from said pattern, said first and second limit switches limiting, respectively, the right and left movements of said carriage relative to said lathe, said third limit switch limiting the inward movement of said cross-slide relative to said carriage, said relay means including traverse in, feed left, feed out, traverse out, traverse right, longitudinal brake, and transverse brake relays.

11. In combination with an alternating current source and a lathe having a carriage and a cross-slide, the provision of a power control system comprising, a first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said second drive means having a traverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross-slide, relay means actuated by said switch means and said limit switches for affecting the operation of the electrical control system, variable biasing means for varying the output of said rectifier system, and compensating means for maintaining the rectifier voltage output constant at a predeterminable setting for varying load conditions, said tracer assembly including first and second scanning means, said switch means including a first and a second switch device actuated by said first and second scanning means, respectively, in accordance with the intelligence obtained from said pattern, said first and second limit switches limiting, respectively, the right and left movements of said carriage relative to said lathe, said third limit switch limiting the inward movement of said cross-slide relative to said carriage, said relay means including traverse in, feed left, feed out, traverse out, traverse right, longitudinal brake, and transverse brake relays, said variable biasing means including a thermionic tube and a potentiometer connected to vary the effective impedance of said thermionic tube.

12. In combination with an alternating current source and a lathe having a carriage and a cross-slide, the provision of a power control system comprising, first drive means for driving the carriage for right and left longitudinal movements, second drive means for driving the cross-slide for in and out transverse movements, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said second drive means having a traverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross-slide, relay means actuated by said switch means and said limit switches for affecting the operation of the electrical control system, variable biasing means for varying the output of said rectifier system, and compensating means for maintaining the rectifier voltage output constant at a predeterminable setting for varying load conditions, said tracer assembly including first and second scanning means, said switch means including a first and a second switch device actuated by said first and second scanning means, respectively, in accordance with the intelligence obtained from said pattern, said first and second limit switches limiting, respectively, the right and left movements of said carriage relative to said lathe, said third limit switch limiting the inward movement of said cross-slide relative to said carriage, said relay means including traverse in, feed left, feed out, traverse out, traverse right, longitudinal brake, and transverse brake relays, said variable biasing means including a thermionic tube and a potentiometer connected to vary the effective impedance of said thermionic tube, said compensating means including a first and second tachometer generator connected, respectively, to said first and second series motors and developing a voltage proportional to speed to vary the effective bias applied to said rectifier system.

13. In combination, drive means having a first and a second speed condition, said first speed condition being greater than said second speed condition, means for operating said drive means in said first speed condition, a condenser, means for charging said condenser, and retardation means governed by the voltage across said condenser for effecting a change from said first to said second speed condition.

14. In combination, a pattern, first and second scanning means for scanning said pattern, mounting means for carrying said first and second scanning means, drive means having a first and second speed condition for providing relative movement between said pattern and said mounting means, said first speed condition being greater than said second speed condition, means for operating said drive means in said first speed condition, a condenser, means for charging said condenser, and retardation means governed by the discharge time of said condenser for effecting a change from said first to said second speed condition.

15. In combination, drive means having a load with a resistive component and having first, second and third speed conditions, said second speed condition being greater than said third speed condition and less than said first speed condition, a condenser, means for charging said condenser, means for operating said drive means in said first speed condition, retardation means governed by the voltage across said condenser for braking said drive means from said first speed condition to a value less than said first speed condition, energization means for operating said drive means in said second speed condition, and means for rendering said energization means inoperative for effecting a change from said second to said third speed condition by the resistive component of said load.

16. In combination with an alternating current source and a machine tool having first and second parts individually movable relative to said machine tool, the provision of a power control system comprising, first drive means for driving the first part along a first line of movement, second drive means for driving the second part along a second line of movement, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said first and second drive means each having a traverse speed and a slower feed speed, said electrical control system including a pattern, a tracer assembly for scanning said pattern for obtaining intelligence therefrom, switch means controlled by said tracer assembly, first, second and third limit switches actuated by movement of the first and second parts relative to said machine tool, relay means actuated by said switch means and said limit switches for affecting the operation of the electrical control system, and variable biasing means for varying the output of the said rectifier system.

17. In combination with an alternating current source and a machine tool having first and second parts individually movable relative to said machine tool, the provision of a power control system comprising, first drive means for driving the first part along a first line of movement, second drive means for driving the second part along a second line of movement, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said first and second drive means each having a traverse speed and a slower feed speed, said electrical control system including a pattern, a tracer assembly for scanning said pattern for obtaining intelligence therefrom, switch means controlled by said tracer assembly, first, second and third limit switches actuated by movement of the first and second parts relative to said machine tool, relay means actuated by said switch means and said limit switches for affecting the operation of the electrical control system, and variable biasing means for varying the output of the said rectifier system, said tracer assembly including first and second scanning means, said switch means including first, second and third switch devices actuated by said first and second scanning means, respectively, in accordance with the intelligence from said pattern.

18. In combination, drive means having a load with a resistive component and having first, second and third speed conditions, said second speed condition being greater than said third speed condition and less than said first speed condition, a condenser, means for charging said condenser, means for operating said drive means in said first speed condition, retardation means governed by the voltage across said condenser for braking said drive means from said first speed condition to a value other than zero and less than said first speed condition, energization means for operating said drive means in said second speed condition, and means for rendering said energization means inoperative for effecting a change from said second to said third speed condition by the resistive component of said load.

19. In combination with an alternating current source and a machine tool having a tool and a base, the provision of a power system comprising, first drive means for driving the tool along a first path relative to said base, second drive means for driving the tool along a second path relative to said base at an angle to said first path, said first and second drive means each including an electric motor, a rectifier device deriving power from said alternating current source and supplying rectified power to both said first and second electric motors, an electrical control system governing the operation of said first and second drive means, said second drive means having a traverse speed and a slower feed speed, said electrical control system including a pattern, a tracer assembly for scanning said pattern for obtaining intelligence therefrom, switch means controlled by said tracer assembly, first, second and third limit switches actuated by movements of the carriage and cross slide, relay means actuated by said switch means and said limit switches for affecting the operation of the electrical control system, variable biasing means for varying the output of the said rectifier system, and compensating means for maintaining the rectifier voltage output constant at a predeterminable setting for varying load conditions.

20. In combination with an alternating current source and a machine tool having first and second parts individually movable relative to said machine tool, the provision of a power control system comprising, first drive means for driving the first part along a first line of movement, second drive means for driving the second part along a second line of movement, a grid controlled rectifier system deriving power from said alternating current source and supplying rectified power to both said first and second drive means, and an electrical control system governing the operation of said first and second drive means, said first drive means including a first alternating current series motor and a first gear reduction unit, said second drive means including a second alternating current series motor and a second gear reduction unit, said first and second drive means each having a traverse speed and a slower feed speed, said electrical control system including a pattern, a tracer assembly for scanning said pattern for obtaining intelligence therefrom, switch means controlled by said tracer assembly, and relay means actuated by said switch means for affecting the operation of the electrical control system.

CLAUDE E. GREENE.
ROBERT B. LESHER.

REFERENCES CITED

The following references are of record in the file of this patent:

UNITED STATES PATENTS

| Number | Name | Date |
|---|---|---|
| 2,025,748 | Howe | Dec. 31, 1935 |
| 2,112,682 | Ryder | Mar. 29, 1938 |
| 2,214,020 | Harwood et al. | Sept. 10, 1940 |
| 2,228,902 | Allen | Jan. 14, 1941 |
| 2,388,555 | Kuehni | Nov. 6, 1945 |
| 2,410,295 | Kuehni et al. | Oct. 29, 1946 |
| 2,413,274 | Wilkie et al. | Dec. 24, 1946 |
| 2,434,854 | Junkins et al. | Jan. 20, 1948 |

FOREIGN PATENTS

| Number | Country | Date |
|---|---|---|
| 847,177 | France | Oct. 4, 1939 |
| 505,470 | Great Britain | May 11, 1939 |